US012678905B2

(12) United States Patent     (10) Patent No.:   US 12,678,905 B2
Sugita     (45) Date of Patent:    Jul. 14, 2026

(54) DUST BAG FOR POWER TOOL AND POWER TOOL

(71) Applicant: MAKITA CORPORATION, Anjo (JP)

(72) Inventor: Fumihide Sugita, Anjo (JP)

(73) Assignee: MAKITA CORPORATION, Anjo (JP)

( * ) Notice: Subject to any disclaimer, the term of this patent is extended or adjusted under 35 U.S.C. 154(b) by 354 days.

(21) Appl. No.: 18/428,331

(22) Filed: Jan. 31, 2024

(65) Prior Publication Data

US 2024/0278370 A1     Aug. 22, 2024

(30) Foreign Application Priority Data

Feb. 16, 2023    (JP) ................................ 2023-022199

(51) Int. Cl.
*B23Q 11/00*       (2006.01)
(52) U.S. Cl.
CPC ................................ *B23Q 11/0042* (2013.01)
(58) Field of Classification Search
CPC .... A47L 9/14–9/149; B23Q 11/0042–11/0075
See application file for complete search history.

(56) References Cited

U.S. PATENT DOCUMENTS 2,005,691 A * 6/1935 Hertz ......................... A47L 9/14
55/374
3,583,821 A * 6/1971 Shaub ................ B23Q 11/0816
408/72 R 3,874,857 A * 4/1975 Hunt ................... B01D 46/4281
55/379
4,569,100 A * 2/1986 Purkapile ................ A47L 5/365
15/327.2
5,637,034 A     6/1997 Everts et al.
(Continued)

FOREIGN PATENT DOCUMENTS

DE     3126511 A1 * 3/1983
DE    10306974 A1   9/2004
(Continued)

OTHER PUBLICATIONS

U.S. Appl. No. 18/428,294, filed Jan. 31, 2024 in the name of Fumihide Sugita.
May 8, 2026 Office Action issued in U.S. Appl. No. 18/428,294.

*Primary Examiner* — Jacob J Cigna
(74) *Attorney, Agent, or Firm* — Oliff PLC

(57) ABSTRACT

A dust bag includes a frame disposed inside the bag main body. The frame includes at least one non-flexible portion extending in the first direction and/or a second direction perpendicular to the first direction so as not to have flexibility in the first direction, and at least one flexible portion coupled with the at least one non-flexible portion and extending in an intersection direction intersecting with the first direction and the second direction so as to have flexibility in the first direction. The frame is configured to be extensible and compressive in the first direction due to the at least one flexible portion deflected when an external force is applied in the first direction. A total width of the at least one flexible portion in the first direction is equal to or wider than a total width of the at least one non-flexible portion in the first direction.

18 Claims, 11 Drawing Sheets

(56)                    References Cited

U.S. PATENT DOCUMENTS

| | | | | |
|---|---|---|---|---|
| 5,913,448 | A * | 6/1999 | Mann .................... | B65D 21/086 |
| | | | | 220/666 |
| 6,179,696 | B1 | 1/2001 | Duffy | |
| 6,514,131 | B1 * | 2/2003 | Reich ................. | B23Q 11/0046 |
| | | | | 451/344 |
| 7,069,968 | B2 * | 7/2006 | Thomas .................... | B27C 1/14 |
| | | | | 144/48.5 |
| 7,108,028 | B2 * | 9/2006 | Thomas .................... | B27C 1/10 |
| | | | | 144/154.5 |
| 7,296,603 | B2 | 11/2007 | Thomas | |
| 7,976,363 | B2 * | 7/2011 | Reich ................. | B23Q 11/0071 |
| | | | | 451/451 |
| 2006/0068689 | A1 | 3/2006 | Kiss et al. | |
| 2010/0048101 | A1 | 2/2010 | King et al. | |
| 2012/0003905 | A1 | 1/2012 | Leung et al. | |
| 2014/0378034 | A1 | 12/2014 | Clabunde | |
| 2024/0009795 | A1 | 1/2024 | Neuhoff et al. | |

FOREIGN PATENT DOCUMENTS

| | | | |
|---|---|---|---|
| EP | 3 235 602 A2 | 10/2017 | |
| JP | H09-254033 A | 9/1997 | |
| JP | 2010125052 A * | 6/2010 | |

* cited by examiner

UP

FRONT ← → REAR

DOWN

A-A

B–B

1

DUST BAG FOR POWER TOOL AND POWER TOOL

TECHNICAL FIELD

The present disclosure relates to a dust bag for a power tool and a power tool.

BACKGROUND

Power tools may be provided with a dust bag detachably mounted thereon for collecting dust generated in the course of machining (for example, cutting, grinding, polishing, or sanding) work. One conventionally known type of such a dust bag is a dust bag including a main body made of cloth and a connector for connecting to the power tool. The connector includes a through-hole in communication with the inside of the bag main body. When air containing the dust flows into the bag main body via the through-hole, the cloth bag main body functions as a filter, thereby allowing the dust to be deposited on the inner surface of the bag main body and also the air to pass through the bag main body to flow outward. When the bag main body is filled with the dust, a user detaches the dust bag from the power tool and discharges the dust accumulated inside the bag main body to outside. More specifically, the user discharges the dust through the through-hole by shaking up and down the dust bag while holding the dust bag with his/her hand in such a manner that the through-hole is located on the lower side.

Japanese Patent Application Laid-Open No. H9-254033 discloses a technique that allows such a dust bag to maintain the outer shape of the bag main body by disposing a frame inside the bag main body. More specifically, a connector includes two frames extending in a rod-like manner oppositely from each other toward the bag main body. These two frames stretch the cloth bag main body outward, thereby keeping the bag main body in a state constantly under a tension and thus maintaining the outer shape thereof as a result thereof.

SUMMARY

The present specification discloses a dust bag for a power tool. This dust bag may include a bag main body made of cloth, a connector for connecting to the power tool having a through-hole opened in a first direction and in communication with an inside of the bag main body, and a frame disposed inside the bag main body so as to maintain an outer shape of the bag main body. The frame may include at least one non-flexible portion extending in the first direction and/or a second direction perpendicular to the first direction so as not to have flexibility in the first direction, and at least one flexible portion coupled with the at least one non-flexible portion and extending in an intersection direction intersecting with the first direction and the second direction so as to have flexibility in the first direction. The frame may be configured to be extensible and compressible in the first direction due to the at least one flexible portion deflected when an external force is applied in the first direction. A total width of the at least one flexible portion in the first direction may be equal to or wider than a total width of the at least one non-flexible portion in the first direction.

In a case where the at least one flexible portion includes a plurality of flexible portions, the "total width" of the at least one flexible portion in the first direction means a sum of widths occupied by the plurality of flexible portions in all of the at least one flexible portion and the at least one non-flexible portion in the first direction. Similarly, in a case where the at least one non-flexible portion includes a plurality of non-flexible portions, the "total width" of the at least one non-flexible portion in the first direction means a sum of widths occupied by the plurality of non-flexible portions in all of the at least one flexible portion and the at least one non-flexible portion in the first direction. According to the above-described configuration, the frame is extensible and compressible in the first direction when the external force is applied in the first direction. Therefore, a user can extend and compress the bag main body together with the frame by pressing the bag main body in the first direction with his/her hand at the time of work of discharging dust. This can facilitate the discharge of the dust deposited on the inner surface of the bag main body, thereby improving user's convenience. In addition, because the total width of the at least one flexible portion in the first direction is equal to or wider than the total width of the at least one non-flexible portion in the first direction (i.e., the total width of the at least one flexible portion in the first direction accounts for a half or more of the entire width of the frame in the first direction), a sufficient extension and compression performance can be provided.

The present specification further discloses a dust bag for a power tool. This dust bag may include a bag main body made of cloth, a connector for connecting to the power tool having a through-hole opened in a first direction and in communication with an inside of the bag main body, and a frame disposed inside the bag main body so as to maintain an outer shape of the bag main body. The frame may include at least one non-flexible portion extending in the first direction and/or a second direction perpendicular to the first direction so as not to have flexibility in the first direction, and at least one flexible portion coupled with the at least one non-flexible portion and extending in an intersection direction intersecting with the first direction and the second direction so as to have flexibility in the first direction. The frame may be configured to be extensible and compressible in the first direction due to the at least one flexible portion deflected when an external force is applied in the first direction. The frame may be shaped and sized so as to keep the outer shape of the bag main body to a generally cuboidal shape rectangular in cross-section perpendicular to the first direction.

According to the above-described configuration, a user can extend and compress the bag main body together with the frame by pressing the bag main body in the first direction with his/her hand at the time of work of discharging dust. This can facilitate the discharge of the dust deposited on the inner surface of the bag main body. In addition, the outer shape of the bag main body can be kept to a generally cuboidal shape rectangular in cross-section, and therefore the bag main body is prevented from sagging to get in the way of the user during the work. Further, this configuration allows the power tool to be arranged with a layout compact in a shorter-side direction of a rectangular cross-sectional shape.

DETAILED DESCRIPTION OF THE EMBODIMENTS

Figure 1:
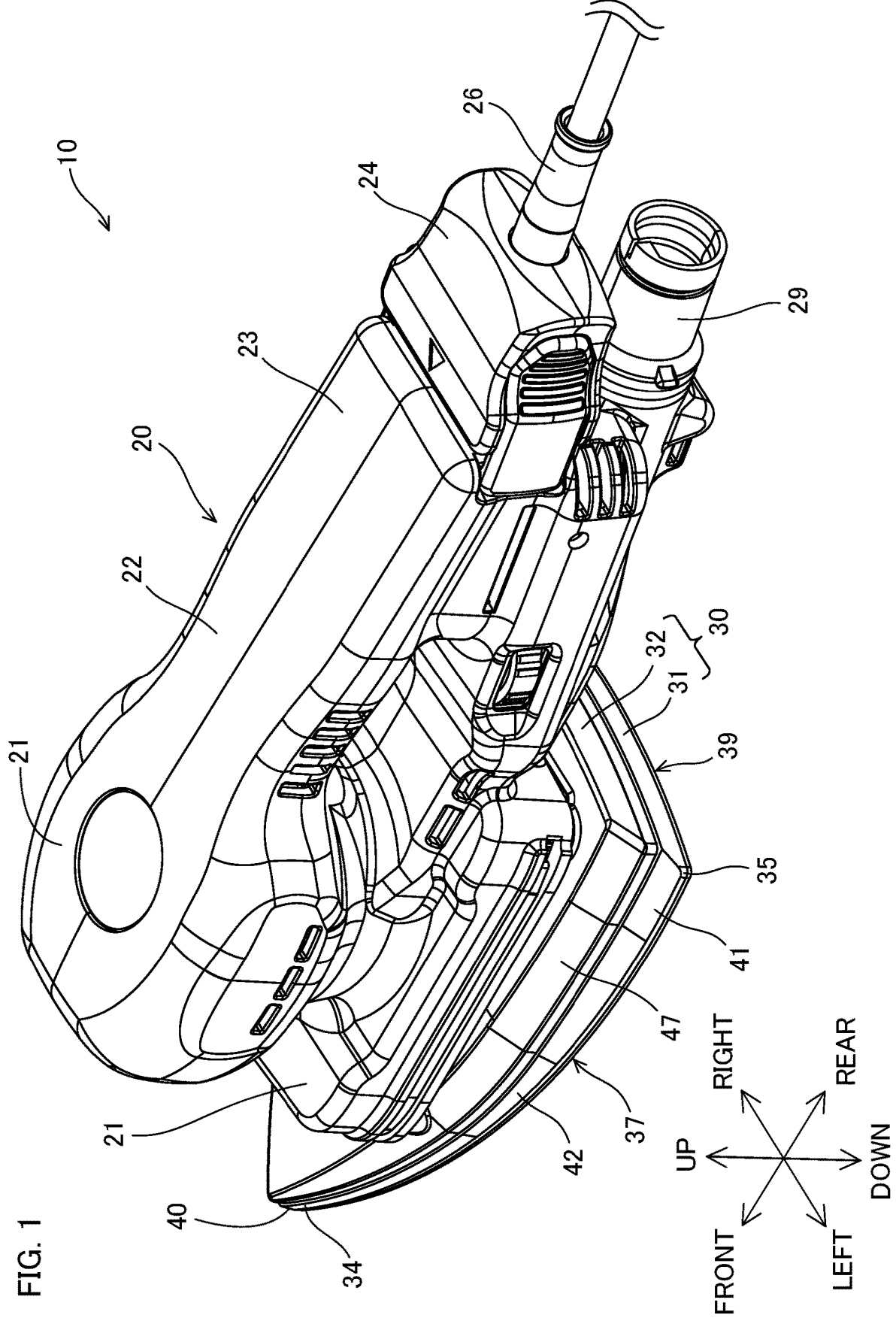
FIG. 1 is a perspective view of a sander according to one embodiment.

Representative and non-limiting specific examples of the present invention will be described in detail below with reference to the drawings. This detailed description is merely intended to teach a person of skill in the art details for practicing preferred examples of the present invention and is not intended to limit the scope of the present invention. Furthermore, each of additional features and inventions disclosed below can be utilized separately from or together with the other features and inventions to provide further improved apparatuses and methods for manufacturing and using the same.

Moreover, combinations of features and steps disclosed in the following detailed description are not necessary to practice the present invention in the broadest sense, and are instead taught merely to particularly describe a representative specific example of the present invention. Furthermore, various features of the above-described and the following representative examples, as well as various features recited in the independent and dependent claims below, do not necessarily have to be combined in herein specifically exemplified manners or enumerated orders to provide additional and useful embodiments of the present invention.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges and indications of groups or aggregations are intended to disclose every possible intermediate individual forming them for the purpose of original written disclosure, as well as for the purpose of restricting the claimed subject matter.

In one or more embodiments, the at least one non-flexible portion may include a plurality of non-flexible portions. The at least one flexible portion may include a plurality of flexible portions. The non-flexible portions and the flexible portions may be alternately coupled along the first direction. According to this configuration, compared to a frame including only a single flexible portion, the dust bag leads to a reduction in the deflection amount per flexible portion, thereby allowing the frame and the bag main body to be further stably extended and compressed (i.e., extended and compressed in a state of further stably maintaining the shape in cross-section perpendicular to the first direction).

In one or more embodiments, the at least one flexible portion may have a pulse shape extending from the at least one non-flexible portion in a direction away from the at least one non-flexible portion and being bent back to extend to the at least one non-flexible portion. According to this configuration, the dust bag allows the frame and the bag main body to be further stably extended and compressed. The pulse shape here includes any shape except for such a shape that a portion protruding from the bottom portion of the pulse is shaped in such a manner that both the rise and the fall of the pulse are perpendicular to the first direction. For example, the pulse shape can include a sawtooth waveform, a triangle waveform, a circular arc shape, and the like.

In one or more embodiments, the at least one non-flexible portion may include a first-side non-flexible portion and a second-side non-flexible portion disposed so as to be spaced apart from each other in the second direction or a third direction perpendicular to the first direction and different from the second direction. The at least one flexible portion may include a first-side flexible portion having a pulse shape extending from the first-side non-flexible portion toward the second-side non-flexible portion and bent back to extend to the first-side non-flexible portion, and a second-side flexible portion having a pulse shape extending from the second-side non-flexible portion toward the first-side non-flexible portion and bent back to extend to the second-side non-flexible portion. According to this configuration, the dust bag allows the frame and the bag main body to be further stably extended and compressed.

In one or more embodiments, the first-side flexible portion and the second-side flexible portion may be coupled with each other. According to this configuration, the dust bag allows the frame and the bag main body to be further stably extended and compressed.

In one or more embodiments, the first-side flexible portion may include a first distal edge portion having the pulse shape. The second-side flexible portion may include a second distal edge portion having the pulse shape. The first distal edge portion and the second distal edge portion may be coupled in a direction in which the first-side non-flexible portion and the second-side non-flexible portion are spaced apart from each other. According to this configuration, the dust bag can minimize the portion where the first-side flexible portion and the second-side flexible portion are coupled. Therefore, the dust bag allows the coupling portion to less impair the flexibility of the at least one flexible portion. Further, the dust bag also allows the frame to be manufactured using a smaller amount of material.

In one or more embodiments, the frame may be made from synthetic resin. According to this configuration, the frame can be easily manufactured. Further, the frame can be reduced in weight.

In one or more embodiments, the frame may be an integrally formed member. According to this configuration, the number of manufacturing processes can be reduced. The integrally formed member refers to a member manufactured without use of secondary adhesion or mechanical joining.

In one or more embodiments, the frame may be shaped and sized so as to keep the outer shape of the bag main body to a generally cuboidal shape rectangular in cross-section perpendicular to the first direction. According to this configuration, the outer shape of the bag main body can be kept to a generally cuboidal shape rectangular in cross-section, and therefore the bag main body is prevented from sagging to get in the way of the user during the work. In addition, this configuration allows the power tool to be arranged with a layout compact in a shorter-side direction of a rectangular cross-sectional shape.

In one or more embodiments, a power tool may be provided. This power tool may include a dust bag according to any one of the above-described configurations, an electric motor, and a connector for connecting to the connector of the dust bag. According to this configuration, advantageous effects similar to the dust bag according to any one of the above-described configurations can be acquired.

In one or more embodiments, a power tool may be provided. This power tool may include a dust bag including a frame shaped and sized so as to keep an outer shape of a bag main body to a generally cuboidal shape rectangular in cross-section perpendicular to a first direction, an electric motor, and a connector for connecting to the connector of the dust bag. The power tool may be configured in such a manner that, when the dust bag is mounted on the power tool by connecting the connector of the dust bag to the connector of the power tool, a cable or a cord for supplying power to the electric motor, which is provided to the power tool or detachably connected to the power tool, and the dust bag are arranged in a shorter-side direction of the rectangle. The present configuration can provide a power tool compact in the direction in which the cable or the cord and the dust bag are arranged while avoiding the interference between the cable or the cord and the dust bag.

In the following description, an orbital sander (hereinafter simply referred to as a sander) 10 according to one exemplary embodiment will be described in further detail with reference to the drawings. The sander 10 exemplary cited in the present embodiment is also called a finishing sander. Further, the sander 10 is also called a delta sander due to the shape of a pad 31, which will be described below.

Figure 4:
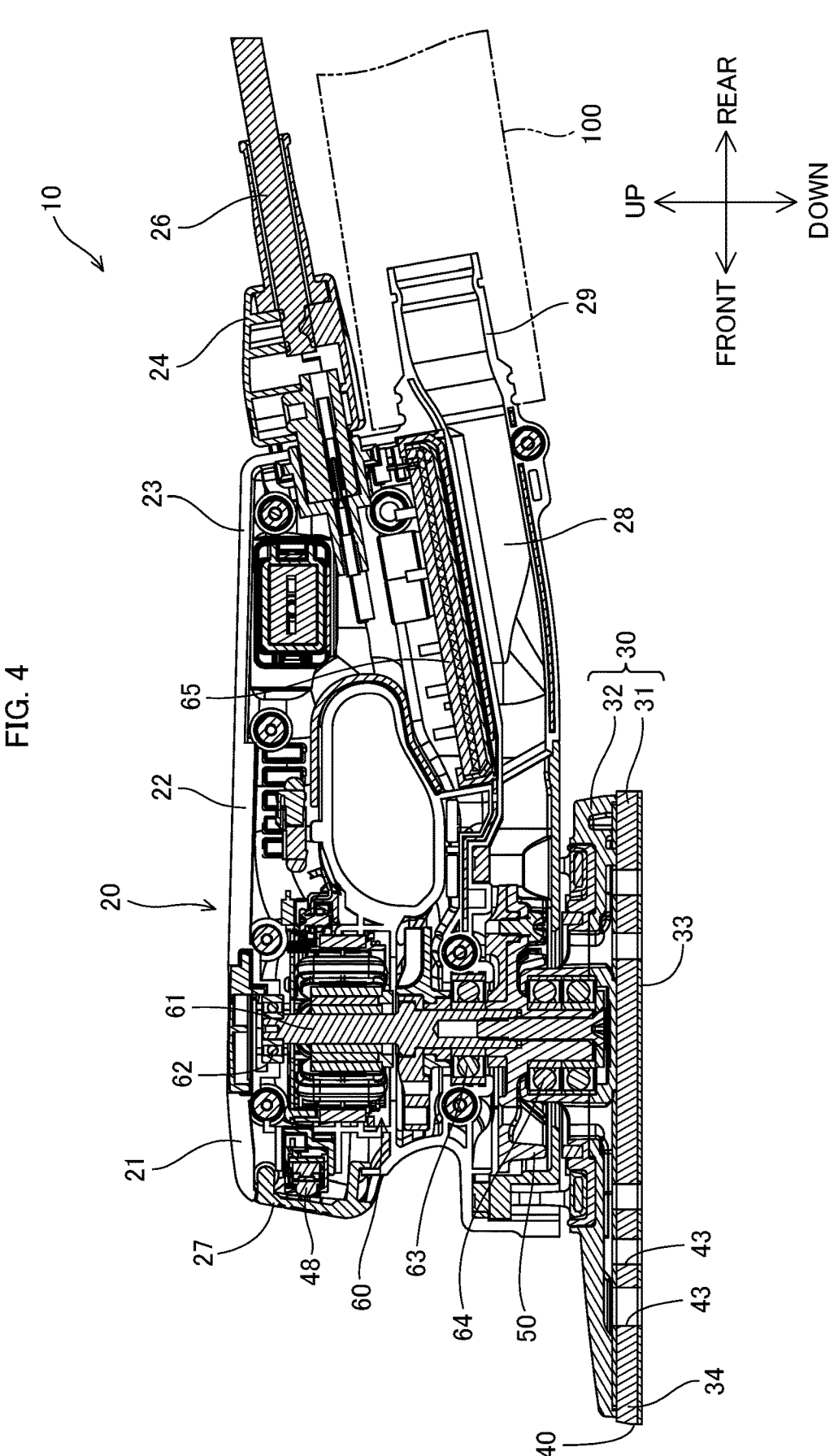
FIG. 4 is a vertical cross-sectional view of the sander taken along a line A-A illustrated in FIG. 2.
Figure 5:
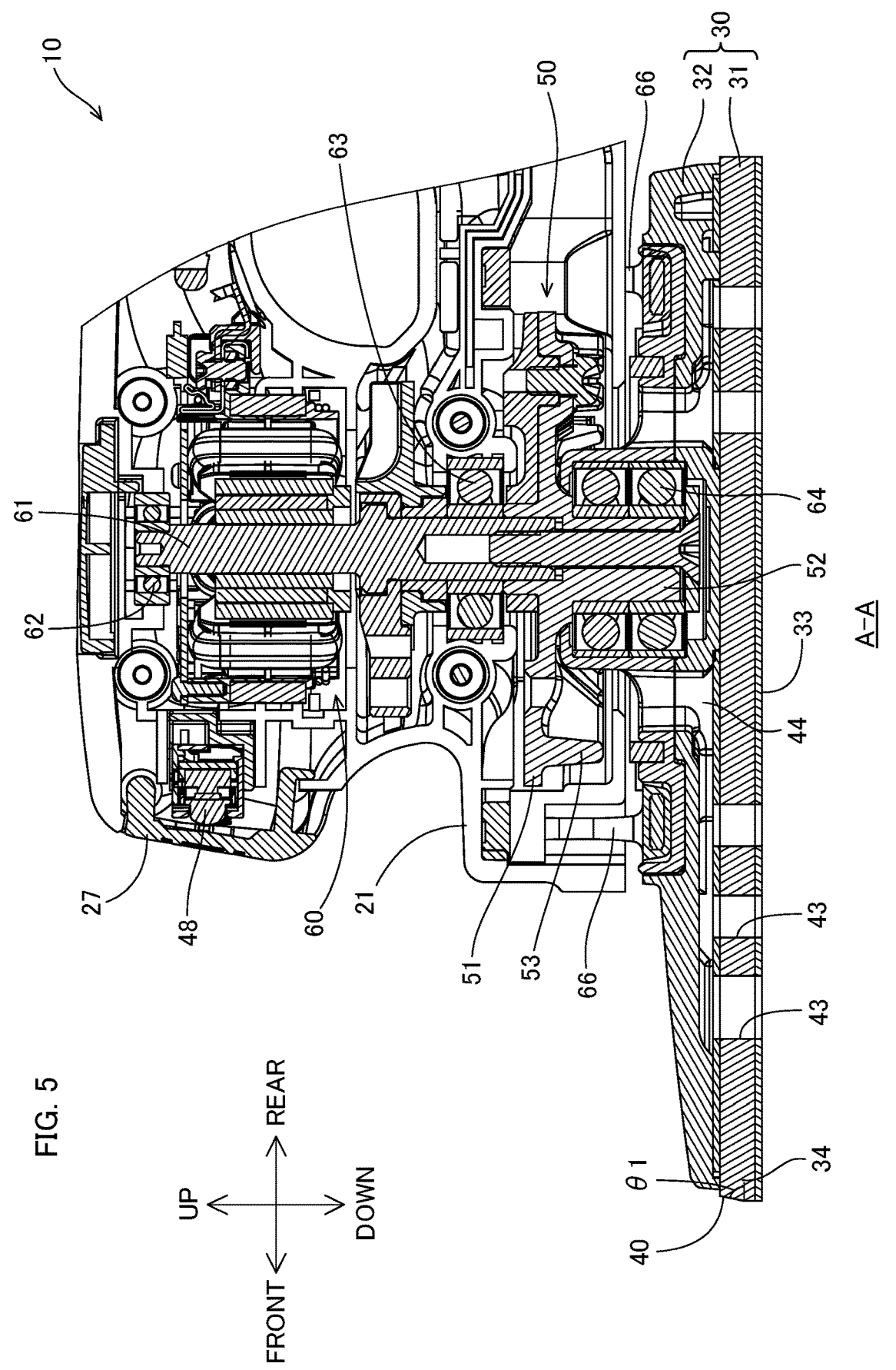
FIG. 5 is a partial enlarged view of FIG. 4.

As illustrated in FIGS. 4 and 5, the sander 10 includes an electric motor 60, a motor shaft 61, and a tool accessory 30. One end of the motor shaft 61 is coupled with the tool accessory 30 via another member. As will be described in detail below, the sander 10 is configured in such a manner that the tool accessory 30 performs a sanding motion according to a rotation of the electric motor 60 (the motor shaft 61).

In the following description, a direction in which the motor shaft 61 extends is defined to be a vertical direction of the sander 10. One side in the vertical direction on which the tool accessory 30 is located is defined to be a lower side, and the opposite side therefrom is defined to be an upper side. Further, the longitudinal direction of the sander 10 perpendicular to the vertical direction is defined to be a front-rear direction of the sander 10. One side in the front-rear direction on which the tool accessory 30 is located is defined to be a front side, and the opposite side therefrom is defined to be a rear side. Further, a direction perpendicular to the front-rear direction and the vertical direction is defined to be a left-right direction of the sander 10. A right side in the left-right direction when the front side is viewed from the rear side is defined to be a right side of the sander 10, and the opposite side therefrom is defined to be a left side of the sander 10.

Figure 2:
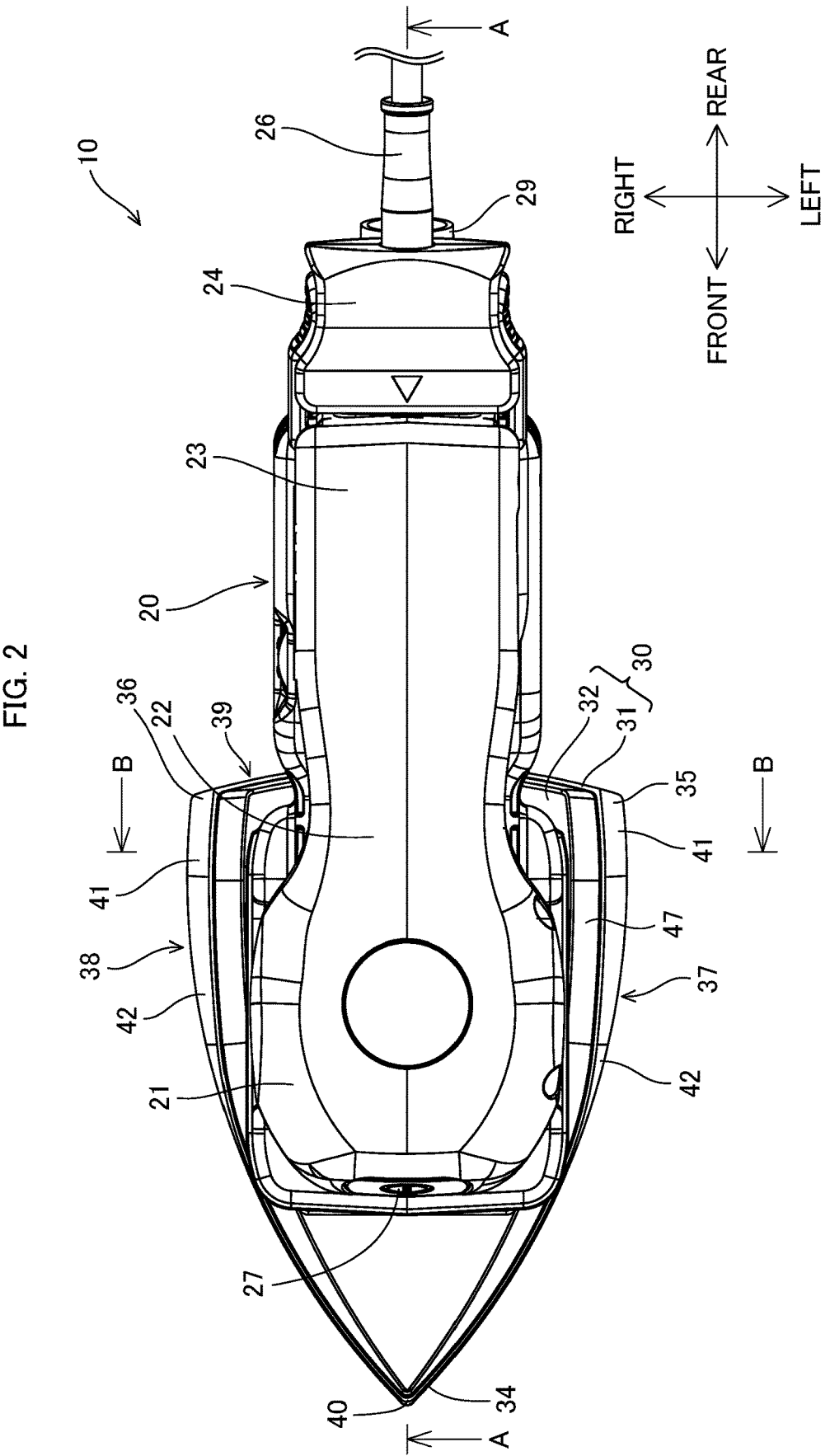
FIG. 2 is a plan view of the sander.
Figure 3:
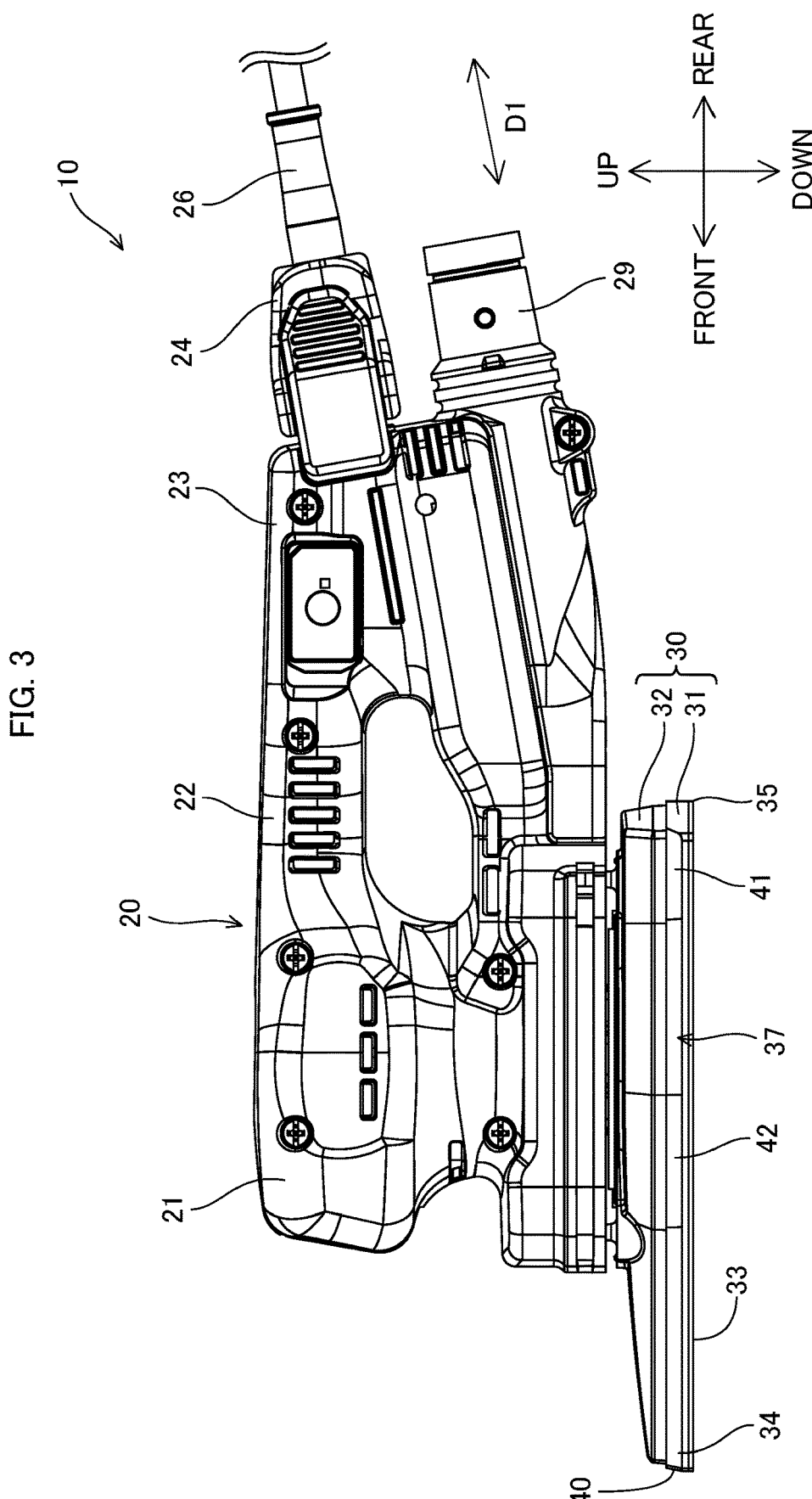
FIG. 3 is a left side view of the sander.

As illustrated in FIGS. 1 to 3, the sander 10 includes a housing 20. The housing 20 includes a front housing portion 21, a grip portion 22, and a rear housing portion 23. The front housing portion 21 and the rear housing portion 23 are coupled in the front-rear direction via a vertically separated forked form, and an upper-side coupling portion functions as the grip portion 22. A connector 24 is disposed at the rear end of the rear housing portion 23. The connector 24 is detachably mountable on the rear housing portion 23. A power source cord 26 extends out of the connector 24 rearward. The power source cord 26 is used to supply a power source to the electric motor 60. In the present embodiment, the power source cord 26 is connected to a battery holster (not illustrated) on which a battery (not illustrated) is mountable. However, a power source cord or a power source cable for supplying a commercial power source may extend out of the housing portion 23 instead of the connector 24 and the power source cord 26. Alternatively, the sander 10 may include a battery mount portion for mounting the battery.

As illustrated in FIG. 4, a controller 65 is contained in the lower portion of the rear housing portion 23. The controller 65 is electrically connected to the power source cord 26 and the electric motor 60, and controls the operation of the electric motor 60 by controlling power that is supplied to the electric motor 60. As illustrated in FIGS. 2 and 4, a switch button 27 is provided at the front portion of the front housing portion 21. The switch button 27 is used to perform an operation of starting up and stopping the electric motor 60. A switch unit 48 is disposed behind the switch button 27 in an interlockable manner. The switch unit 48 is electrically connected to the controller 65.

As illustrated in FIGS. 4 and 5, the electric motor 60 is contained in the front housing portion 21. The motor shaft 61 of the electric motor 60 extends vertically, and is rotatably supported via bearings 62 and 63 fixed to the front housing portion 21. The bearing 62 supports the upper end of the motor shaft 61, and the bearing 63 supports near the lower end of the motor shaft 61.

A dust collection fan 50 is fixed to the lower end of the motor shaft 61 so as to surround the motor shaft 61 circumferentially. As illustrated in FIG. 5, the dust collection fan 50 includes a generally disk-shaped face plate 51, a shaft portion 52, and a plurality of blades 53. The shaft portion 52 protrudes cylindrically downward from the face plate 51 near the center of the face plate 51. The shaft portion 52 is rotatably supported by a bearing 64 in a state eccentric with respect to the motor shaft 61.

As illustrated in FIG. 4, a space containing the dust collection fan 50 is in communication with a dust collection nozzle 29 via a dust collection passage 28 extending in the front-rear direction in the lower portion of the rear housing portion 23. The dust collection nozzle 29 extends cylindrically rearward from the edge portion on the lower side and the rear side of the rear housing portion 23. As illustrated in FIG. 2, the connector 24 is located above the dust collection nozzle 29. A dust bag 100 (refer to FIG. 7) is detachably mounted on the dust collection nozzle 29.

As illustrated in FIGS. 1 and 3, the tool accessory 30 is located at the lowermost portion of the sander 10, and includes a pad 31 and a base 32. The pad 31 includes a flat surface 33 for attaching sanding paper (not illustrated). The flat surface 33 is the bottom surface of the pad 31, and extends horizontally (in a direction perpendicular to the vertical direction). The base 32 is disposed on the pad 31 (more specifically, on a portion of the pad 31 opposite from the flat surface 33). The pad 31 and the base 32 are coupled via a vertically extending bolt (not illustrated).

As illustrated in FIGS. 1 and 2, the pad 31 has a generally triangular outer shape like an iron as viewed vertically in the present embodiment. More specifically, the generally triangular shape of the pad 31 is a generally isosceles triangle having two relatively long sides and one relatively short side extending approximately in the left-right direction. Three corner portions of the pad 31 that respectively include three vertexes of the generally triangular shape will also be referred to as corner portions 34 to 36. The corner portion 34 is a corner portion including a vertex between the two relatively long sides, and is located at the foremost side between the corner portions 34 to 36. The corner portion 34 has an angle equal to or smaller than 90 degrees. A portion of the pad 31 located between the corner portions 34 and 35 will also be referred to as a side edge portion 37. A portion of the pad 31 located between the corner portions 34 and 36 will also be referred to as a side edge portion 38. A portion of the pad 31 located between the corner portions 35 and 36 will also be referred to as a side edge portion 39. The base 32 has a shape and a size corresponding to the outer shape of the pad 31 and also slightly smaller than the pad 31 as viewed vertically.

As illustrated in FIGS. 1, 2, 5, and 6, an inclination angle of the side surface of the pad 31 with respect to the flat surface 33 varies depending on the location. More specifically, the inclination angle of a first portion 40, which is the side surface of the corner portion 34, is a first angle θ1 (refer to FIG. 5). Further, the inclination angle of a second portion 41 of the side surface of the side edge portion 37 that is located adjacent to the corner portion 35 is a second angle θ2 (refer to FIG. 6). Similarly, the inclination angle of a second portion 41 of the side surface of the side edge portion 38 that is located adjacent to the corner portion 36 is the second angle θ2 (refer to FIG. 6). In the present embodiment, the first angle θ1 is approximately 80°, and the second angle θ2 is approximately 35°. However, the first angle θ1 and the second angle θ2 can be set to any angle as long as they satisfy $90° \geq θ1 > θ2 > 0°$. A transition portion 42 is located between the first portion 40 and the second portion 41 on each of the side edge portion 37 and the side edge portion 38. Each transition portion 42 connects the first portion 40 and the second portion 41 in such a manner that the inclination angle of the side surface of the pad 31 gradually changes from the first angle θ1 to the second angle θ2.

Figure 6:
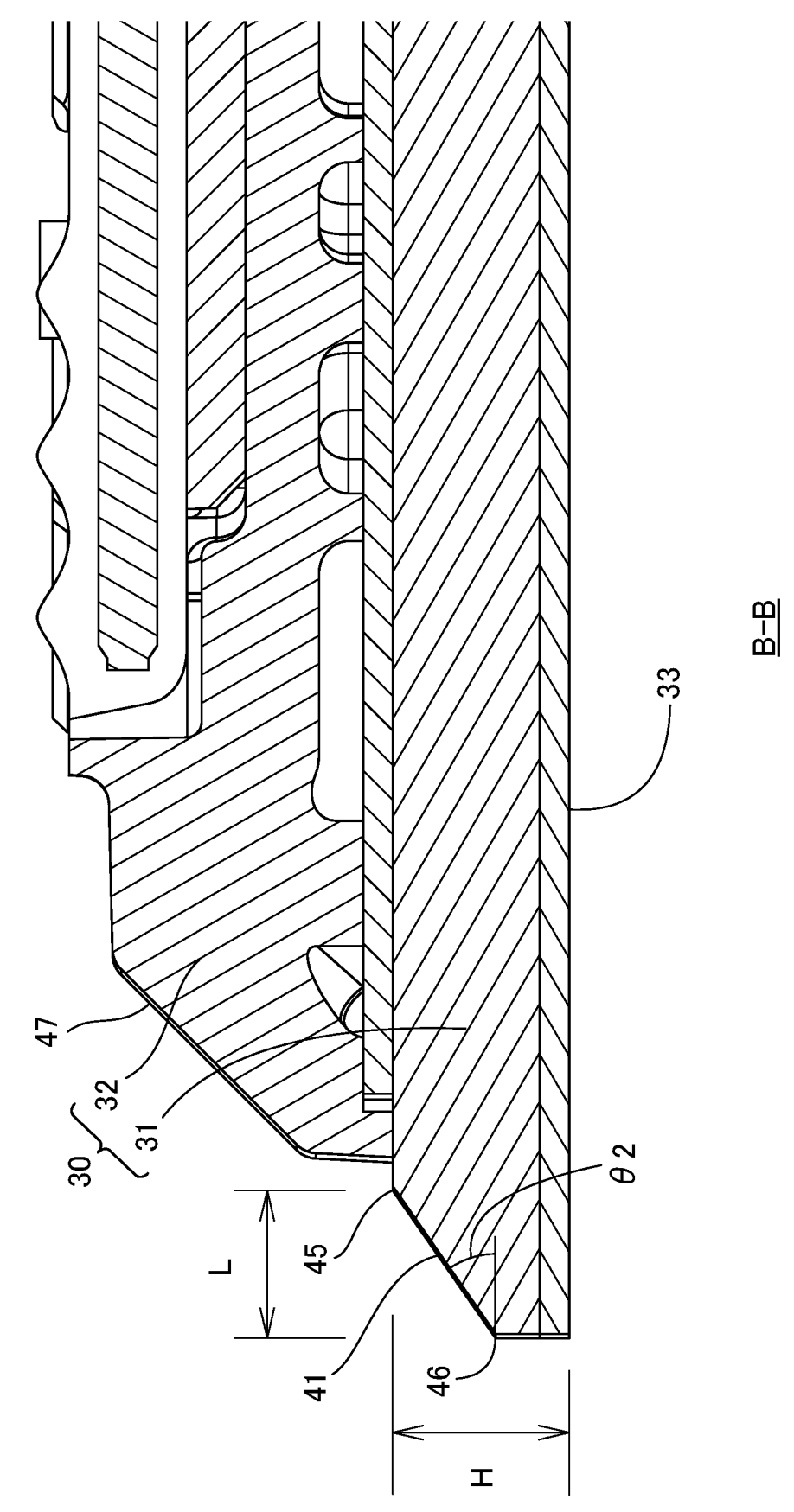
FIG. 6 is a partial vertical cross-sectional view of the sander taken along a line B-B illustrated in FIG. 2.

In the present embodiment, when H is defined to represent the vertical thickness of the pad 31 and L is defined to represent the protruding distance of a distal edge 46 from a proximal edge 45 of the inclination of the second portion 41 as illustrated in FIG. 6, a ratio L/H is set to any value equal to or higher than 0.5 and equal to or lower than 2.5.

As illustrated in FIGS. 1, 2, and 6, a side surface 47 of the base 32 is inclined in the same direction as the pad 31 at least on a portion corresponding to the second portion 41 in the present embodiment. In the present embodiment, the inclination angle of the side surface 47 varies in conformity with the change in the inclination angle of the side surface of the pad 31 from the first portion 40 to the second portion 41. Further, in the present embodiment, the inclination angle of the second portion 41 of the pad 31 is smaller than the inclination angle of the side surface 47 of the base 32.

As illustrated in FIGS. 4 and 5, a plurality of through-holes 43 is formed on the bottom surface of the pad 31. The through-holes 43 vertically extend through the pad 31. A space 44 (refer to FIG. 5) is defined between the pad 31 and the base 32. The space 44 is in communication with the through-holes 43. The space 44 is in communication with the dust collection passage 28. Holes are formed on the sanding paper attached to the bottom surface of the pad 31 at positions corresponding to the through-holes 43 of the pad 31. When the dust collection fan 50 rotates according to the rotation of the motor shaft 61, air flows into the dust bag 100 by passing through the holes of the sanding paper, the through-holes 43, the space 44, and the dust collection passage 28. Dust generated due to the sanding can be collected into the dust bag 100 with the aid of this flow of air.

As illustrated in FIG. 5, the bearing 64 is fixed to the tool accessory 30. The bearing 64 supports the shaft portion 52 of the dust collection fan 50. Therefore, the tool accessory 30 is coupled with the motor shaft 61 via the bearing 64 and the dust collection fan 50. Further, the tool accessory 30 is further coupled operably with the front housing portion 21 via a vertically extending foot 66. The foot 66 is disposed at each of the front portion and the rear portion of the front housing portion 21.

The above-described sander 10 operates in the following manner. First, when the user operates the switch button 27 to drive the electric motor 60, the motor shaft 61 starts rotating. At this time, the bearing 64 coupling the motor shaft 61 and the tool accessory 30, and the shaft portion 52 of the dust collection fan 50 are eccentric with respect to the motor shaft 61 as described above. Therefore, when the motor shaft 61 rotates, the tool accessory 30 performs an eccentric circular motion (an orbital motion) while tilting the foot 66. In other words, the tool accessory 30 does not rotate itself, and moves so as to draw a circle along a horizontal surface while maintaining this posture. When the sanding paper attached to the flat surface 33 of the pad 31 is pressed against a machining target in this state, the sanding is performed.

According to the above-described sander 10, the user can selectively use the first portion 40 and the second portion 41 of the pad 31 inclined at different angles according to use conditions of the sanding work (i.e., according to what kind of region is sanded in the machining target).

For example, when sanding a narrow small machining target region, the user may sand it by pressing only the corner portion 34 with the first portion 40 formed thereon against the machining target region. The first portion 40 is inclined at a relatively large angle and is relatively high in rigidity. Therefore, even when the machining target is sanded with only a small region in the pad 31 pressed against it and a concentrative reaction force is applied only to a part of the pad 31, the pad 31 can sufficiently withstand the reaction force. In addition, because the first portion 40 is formed at the corner portion 34, even when a narrow machining target region in the machining target is sanded, the portion with the first portion 40 formed thereon (i.e., the corner portion 34) can be easily advanced into this machining target region. Especially, because being located at the distal edge of the triangular pad 31, the corner portion 34 can be easily advanced into the narrow machining target region in the machining target. Further, because having an angle equal to or smaller than 90° in a planar view, the corner portion 34 can be easily advanced into the narrow machining target region in the machining target.

Alternatively, when sanding a machining target region that imposes a constraint on an entry height (a distance in the direction perpendicular to a machining target surface) of the pad 31 (for example, a gap between a hinge attached to a machining target and the machining target), the user may sand it by pressing only the side edge portion 37 with the second portion 41 formed thereon (or the side edge portion 37 with the transition portion 42 and the second portion 41 formed thereon) against the machining target region. The second portion 41 is inclined at a relatively small angle, and therefore can be advanced into the machining target region that imposes a constraint on the entry height of the pad 31. Especially, the second portion 41 is formed on each of the side edge portions 37 and 38 between the corner portion 34 and the corner portions 35 and 36, and therefore can be used to efficiently sand a wide range. In addition, the user can sand the machining target region while moving the housing 20 in the direction in which the grip portion 22 extends with the second portion 41 advanced into the machining target region that imposes a constraint on the entry height of the pad 31, and therefore can engage in the sanding work with a natural arm posture and movement. Especially, the second portion 41 has the ratio L/H equal to or higher than 0.5 and equal to or lower than 2.5, and therefore can be easily advanced into the machining target region that imposes a constraint on the entry height of the pad 31. Further, in addition to the pad 31, the side surface 47 of the base 32 is also inclined in the same direction as the pad 31, and therefore the second portion 41 can be further deeply advanced into the machining target region that imposes a constraint on the entry height of the pad 31. Further, the inclination angle of the second portion 41 of the pad 31 is smaller than the inclination angle of the side surface 47 of the base 32, and therefore the second portion 41 can be further easily advanced.

Further, according to the sander 10, the transition portion 42 is formed between the first portion 40 and the second portion 41 of the pad 31, and therefore the concentration of a local stress on the pad 31 can be reduced. As a result, the pad 31 can be improved in strength. Similarly, the side surface 47 of the base 32 is also inclined at a gradually varying angle, and therefore the base 32 can be improved in strength.

Figure 7:
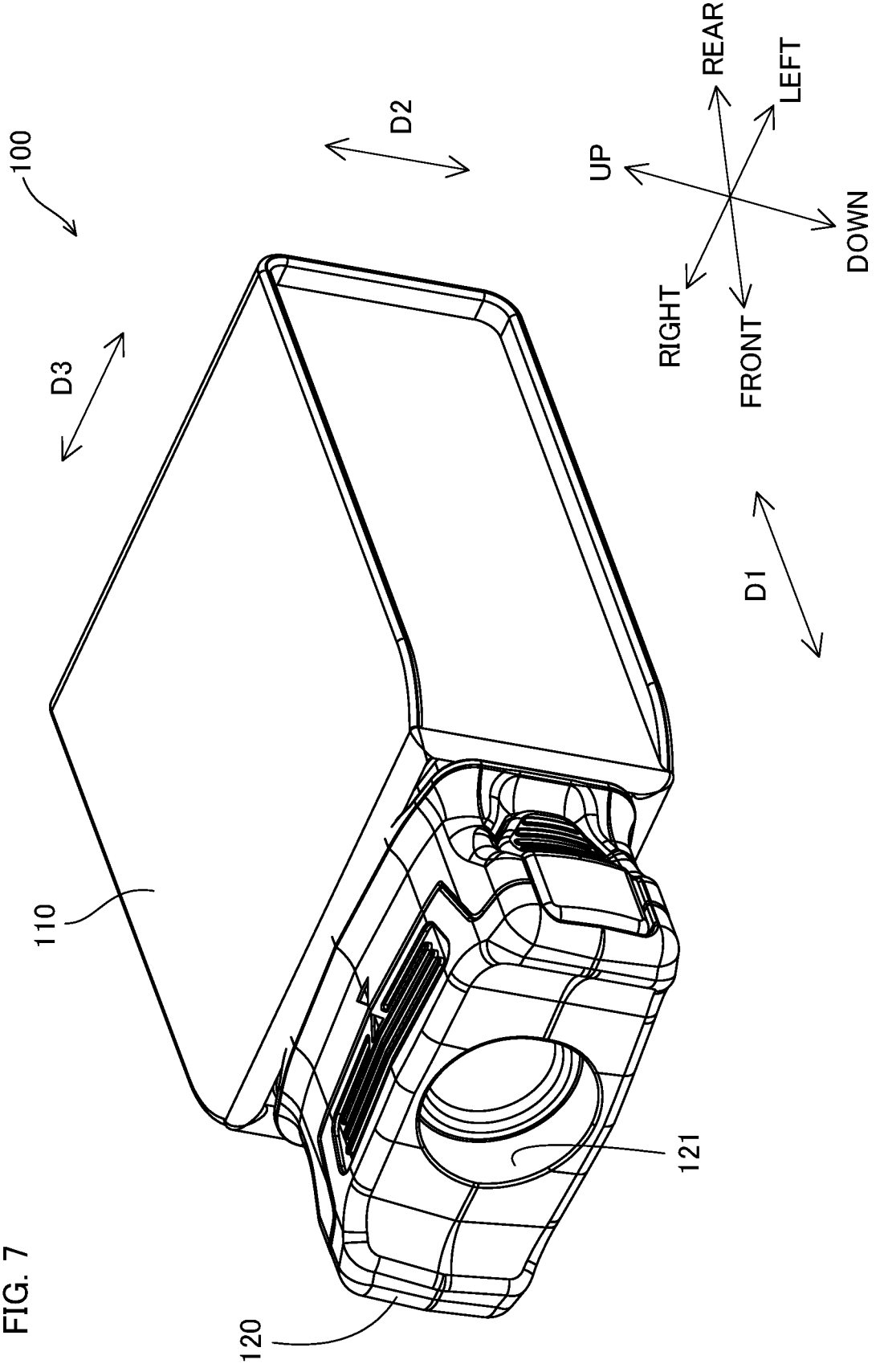
FIG. 7 is a perspective view of a dust bag.

In the following description, the configuration of the dust bag 100 detachably mounted on the dust collection nozzle 29 will be described with reference to FIGS. 7 to 11. Direction indicators in FIGS. 7 to 11 indicate directions with the dust bag 100 mounted on the dust collection nozzle 29. As illustrated in FIG. 7, the dust bag 100 includes a bag main body 110, a connector 120, and a frame 130. The bag main body 110 is made of cloth. The connector 120 is a portion for detachably connecting to the dust collection nozzle 29 of the sander 10, and has a generally cuboidal outer shape in the present embodiment. The connector 120 includes a through-hole 121 opened in the first direction D1. The through-hole 121 is in communication with the inside of the bag main body 110. The through-hole 121 is sized and shaped so as to be fitted to the dust collection nozzle 29.

The first direction D1 is also a direction in which the dust collection nozzle 29 is opened as illustrated in FIG. 3 with the dust bag 100 mounted on the dust collection nozzle 29. In other words, the first direction D1 is a direction inclined slightly upward from the front side toward the rear side with respect to the front-rear direction. As illustrated in FIG. 7, in the present embodiment, the bag main body 110 is kept generally shaped like a cuboid rectangular in cross-section in a direction perpendicular to the first direction D1 with the aid of the frame 130 disposed inside the bag main body 110. In the following description, the longer-side direction of this rectangle will also be referred to as a third direction D3, and the shorter-side direction of the rectangle will also be referred to as a second direction D2. The second direction D2 is a direction inclined slightly forward from the lower side toward the upper side with respect to the vertical direction. The third direction D3 matches the left-right direction.

According to the bag main body 110 shaped in this manner, the bag main body 110 can be configured vertically compactly. As a result, the sander 10 can be configured vertically compactly with the bag main body 110 mounted thereon. Especially, in the present embodiment, the power source cord 26 extends above the bag main body 110 with the bag main body 110 mounted, but the bag main body 110 is shaped so as to be relatively narrow in width in the second direction D2, and therefore the sander 10 can be configured vertically compactly while the interference is avoided between the power source cord 26 and the bag main body 110.

Figure 10:
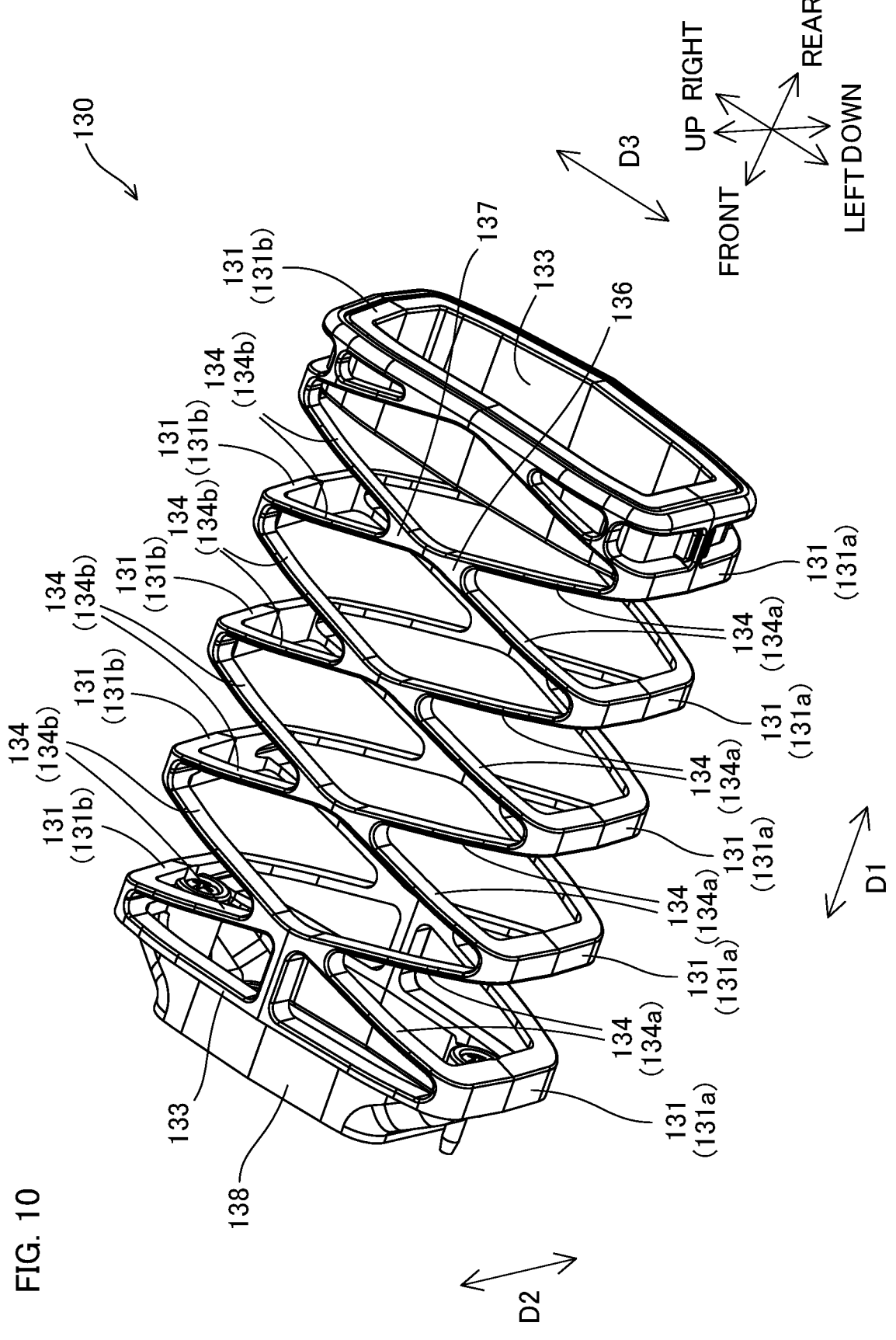
FIG. 10 is a perspective view of a frame of the dust bag.

As illustrated in FIG. 10, the frame 130 includes a plurality (ten in the illustrated example) of non-flexible portions 131, a plurality (four in the illustrated example) of non-flexible portions 133, and a plurality (16 in the illustrated example) of flexible portions 134. Each of the non-flexible portions 131 extends in the second direction D2 perpendicular to the first direction D1 so as to have no flexibility in the first direction D1. In the present embodiment, the five non-flexible portions 131 are disposed so as to be spaced apart from the other five non-flexible portions 131 in the left-right direction (the third direction D3 perpendicular to the first direction D1). The non-flexible portions 131 disposed on the left side will also be referred to as first-side non-flexible portions 131a. The non-flexible portions 131 disposed on the right side will also be referred to as second-side non-flexible portions 131b. The five first-side non-flexible portions 131a are lined up in the first direction D1 at intervals from each other. Similarly, the five second-side non-flexible portions 131b are lined up in the first direction D1 at intervals from each other. The first-side non-flexible portions 131a and the second-side non-flexible portions 131b are disposed at the same positions in the first direction D1 in the present embodiment, but may be disposed at different positions.

The upper end and the lower end of the first-side non-flexible portion 131a located at the foremost side and the upper end and the lower end of the second-side non-flexible portion 131b located at the foremost side are respectively coupled with each other via the two non-flexible portions 133 extending in the third direction D3 perpendicular to the first direction D1. Similarly, the upper end and the lower end of the first-side non-flexible portion 131a located at the rearmost side and the upper end and the lower end of the second-side non-flexible portion 131b located at the rearmost side are respectively coupled with each other via the two non-flexible portions 133 extending in the third direction D3.

The flexible portions 134 are coupled with the non-flexible portions 131, and extend in a direction intersecting with the first direction D1 and the second direction D2 so as to have flexibility in the first direction D1. In the present embodiment, the non-flexible portions 131 and the flexible portions 134 are disposed alternately along the first direction D1. Further, in the present embodiment, the flexible portions 134 include first-side flexible portions 134a, which are disposed on the left side and coupled with the first-side non-flexible portions 131a, and second-side flexible portions 134b, which are disposed on the right side and coupled with the second-side non-flexible portions 131b.

In the present embodiment, the flexible portions 134 each have a shape of a triangle wave pulse (i.e., a V-like shape). More specifically, the first-side flexible portion 134a located on the left side extends from one first-side non-flexible portion 131a rightward (toward the right side where the second-side non-flexible portion 131b is located), and is also bent back in a V-shaped manner to extend to the adjacent first-side non-flexible portion 131a. The second-side flexible portion 134b located on the right side extends from one second-side non-flexible portion 131b leftward (toward the left side where the first-side non-flexible portion 131a is located), and is also bent back in a V-shaped manner to extend to the adjacent second-side non-flexible portion 131b. The shape of the flexible portion 134 can be changed to any pulse shape (for example, a circular arc-shaped pulse or a sawtooth wave pulse).

The first-side flexible portions 134a include first-side flexible portions 134a disposed on the upper side and coupled with the upper ends of the first-side non-flexible portions 131a, and first-side flexible portions 134a disposed on the lower side and coupled with the lower ends of the first-side non-flexible portions 131a. Similarly, the second-side flexible portions 134b include second-side flexible portions 134b disposed on the upper side and coupled with the upper ends of the second-side non-flexible portions 131b, and second-side flexible portions 134b disposed on the lower side and coupled with the lower ends of the second-side non-flexible portions 131b.

In the present embodiment, the first-side flexible portions 134a and the second-side flexible portions 134b are coupled with each other. More specifically, each of the first-side flexible portions 134a includes a first distal edge portion 136 located at the tip of the pulse shape thereof (the vertex of the V shape). Similarly, each of the second-side flexible portions 134b includes a second distal edge portion 137 located at the tip of the pulse shape thereof. The first distal edge portion 136 and the second distal edge portion 137 are coupled with each other in the third direction D3 (i.e., a direction in which the first-side non-flexible portion 131a and the second-side non-flexible portion 131b are spaced apart from each other).

Figure 8:
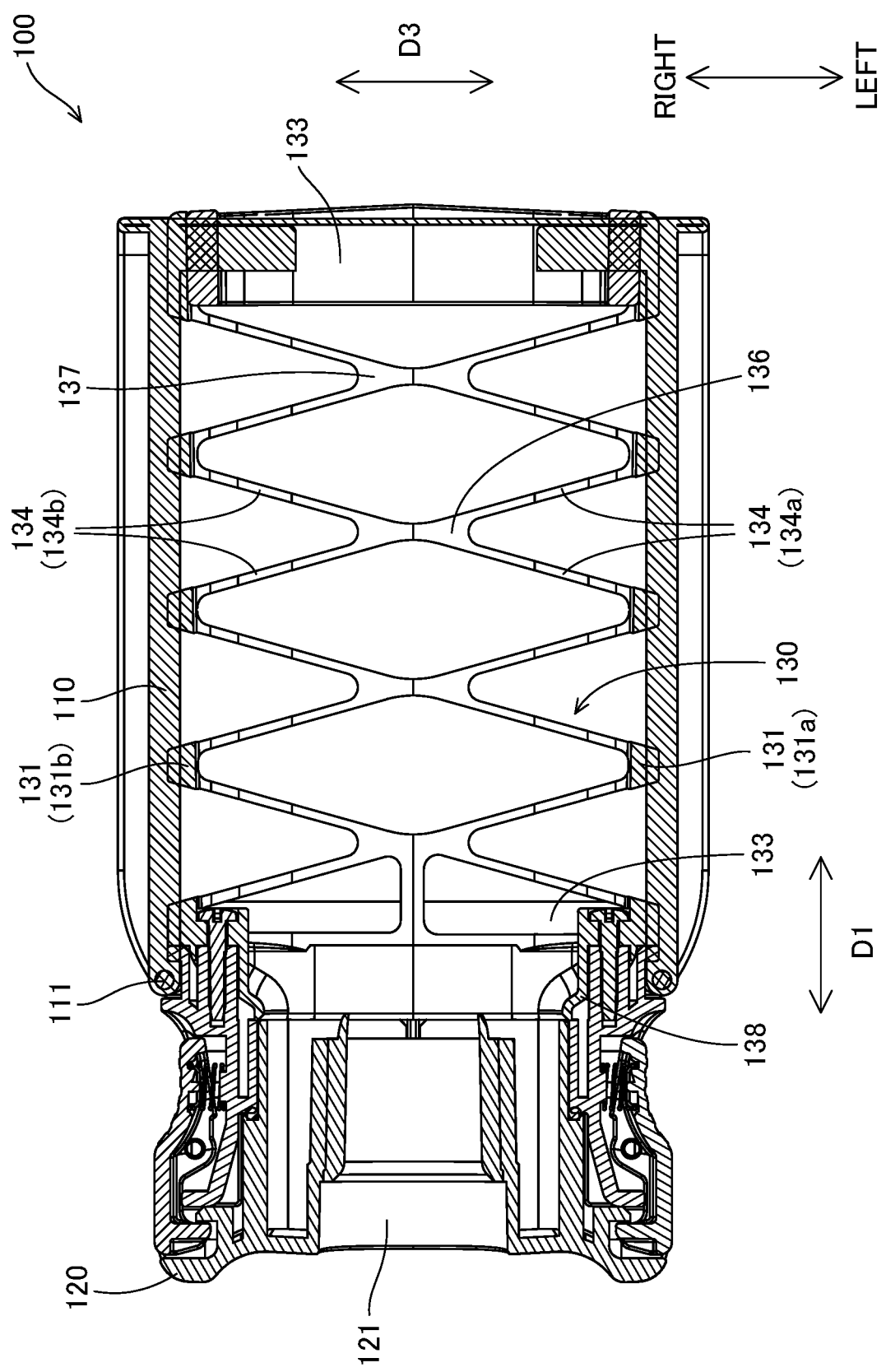
FIG. 8 is a transverse cross-sectional view at the center of the dust bag.
Figure 9:
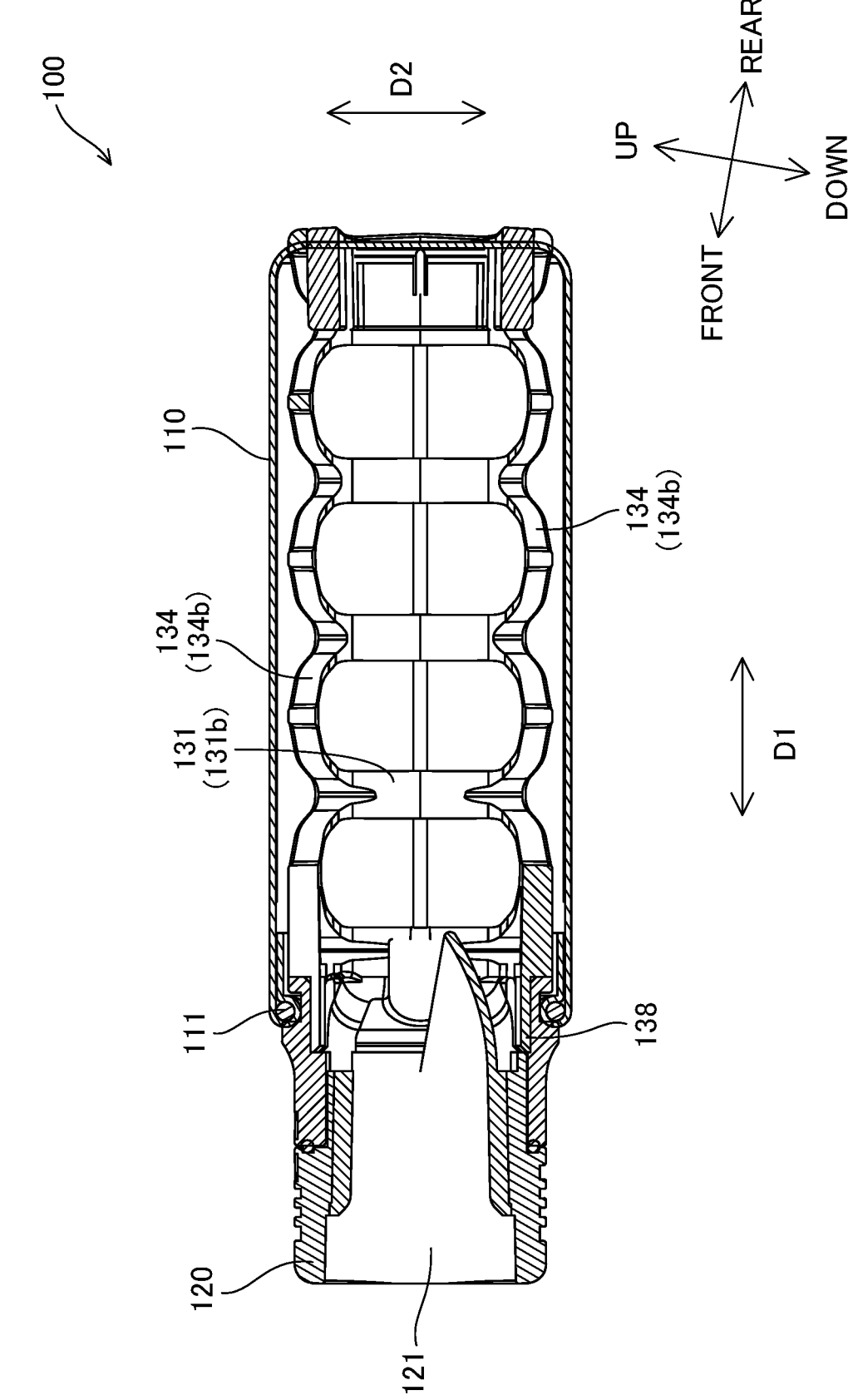
FIG. 9 is a vertical cross-sectional view at the center of the dust bag.

A tubular fitted portion 138 protrudes forward in the first direction D1 from the non-flexible portions 131 located at the foremost side and the non-flexible portions 133 on the front side. As illustrated in FIG. 8, the fitted portion 138 is fitted in the connector 120 and is screwed to the connector 120 in this state. Due to that, the frame 130 is coupled with the connector 120. Further, in such a coupled state, the front edge portion of the bag main body 110 is fitted on the outer periphery of the rear edge portion of the connector 120, and a band 111 is attached so as to surround the bag main body 110 circumferentially (the second direction D2 and the third direction D3), as illustrated in FIGS. 8 and 9. As a result, the bag main body 110 is tightened inward by the band 111, and the bag main body 110 is coupled with the connector 120 and the frame 130.

At this time, the first-side non-flexible portions 131a and the second-side non-flexible portions 131b provide an outward tension to the bag main body 110 in the left-right direction in abutment with the inner surface of the bag main body 110. Due to that, the width of the bag main body 110 in the third direction D3 is kept equal to the distance by which the first-side non-flexible portions 131a and the second-side non-flexible portions 131b are spaced apart from each other. Further, as illustrated in FIG. 9, the non-flexible portions 131 extend over most of the width of the bag main body 110 in the second direction D2, and therefore the width of the bag main body 110 in the second direction D2 is prevented from considerably reducing due to a sag or deflection of the bag main body 110. Therefore, the frame 130 can keep the outer shape of the bag main body 110 generally cuboidal as illustrated in FIG. 7. As a result, the bag main body 110 is prevented from sagging to get in the way of the user during the sanding work.

In the present embodiment, the frame 130 structured in the above-described manner is made from synthetic resin. Therefore, even though the frame 130 is relatively complicatedly structured as described above, the frame 130 can be easily manufactured. Further, the frame 130 can be reduced in weight. However, the frame 130 can be manufactured from any material. Further, in the present embodiment, the frame 130 is an integrally formed member (one-piece member). Therefore, the frame 130 can be manufactured with a smaller number of processes. However, the frame 130 may be manufactured by bonding or mechanically joining two or more members.

According to the above-described dust bag 100, the frame 130 can be extended or compressed in the first direction D1 due to the flexible portions 134 deflected when an external force is applied in the first direction D1. Therefore, the user can extend and compress the bag main body 110 together with the frame 130 by pressing the bag main body 110 in the first direction D1 with his/her hand when detaching the dust bag 100 from the dust collection nozzle 29 and carrying out the work of discharging dust accumulated in the dust bag 100. This can facilitate the discharge of the dust deposited on the inner surface of the bag main body 110 via the through-hole 121. Further, the frame 130 can provide the extension and compression function in the first direction D1 while keeping the outer shape of the bag main body 110 generally cuboidal in contrast to a coil spring.

Figure 11:
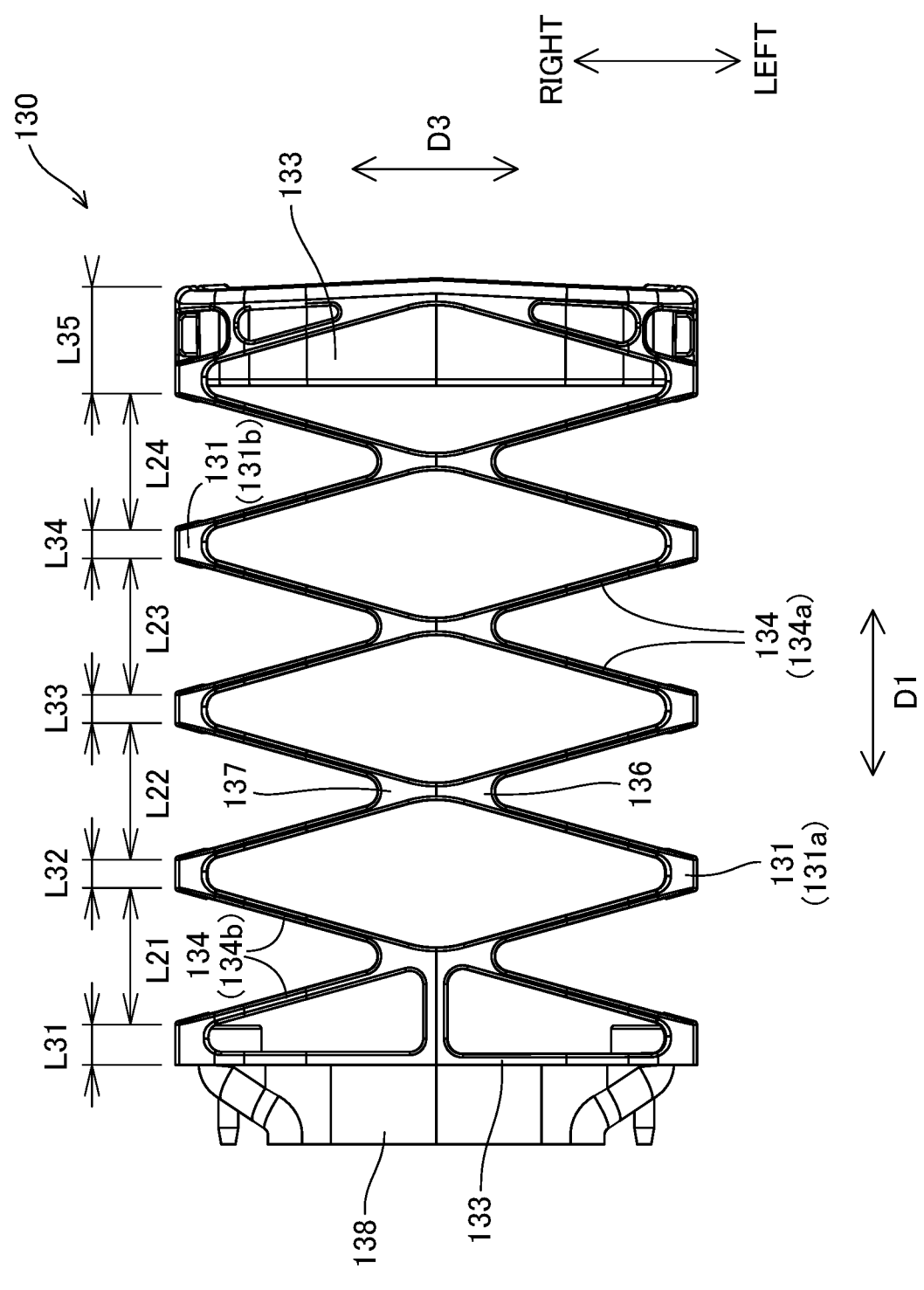
FIG. 11 is a plan view of the frame.

In addition, in the present embodiment, as illustrated in FIG. 11, the total width of the flexible portions 134 in the first direction D1 (L21+L22+L23+L24 in FIG. 11) is equal to or longer than the total width of the non-flexible portions 131 in the first direction D1 (L31+L32+L33+L34 in FIG. 11). Therefore, the present embodiment provides a sufficient extension and compression performance of the frame 130 and the bag main body 110, thereby also improving the performance of discharging the dust. Each of L31 to L34 may be greater than the thickness of the flexible portion 134 like the example illustrated in FIG. 11. This arrangement causes the non-flexible portions 131 to abut against each other in the first direction D1 before the flexible portions 134 are maximally deflected, and therefore can prevent the frame 130 (the flexible portions 134) from being damaged even when the user unintentionally applies a strong force in the first direction D1.

Further, according to the dust bag 100, the non-flexible portions 131 and the flexible portions 134 are coupled alternately along the first direction D1. Therefore, compared to a frame including only a single flexible portion having a width in the first direction D1 that corresponds to the sum of the widths of the plurality of flexible portions 134 in the first direction D1, the dust bag 100 leads to a reduction in the deflection amount per flexible portion 134, thereby allowing the frame 130 and the bag main body 110 to be further stably extended and compressed (i.e., extended and compressed in a state of further stably maintaining the shape in cross-section perpendicular to the first direction D1).

Further, according to the dust bag 100, the flexible portions 134 have a pulse shape, and this allows the frame 130 and the bag main body 110 to be further stably extended and compressed. Further, the flexible portions 134 include the pulse-shaped first-side flexible portions 134a and the opposite pulse-shaped second-side flexible portions 134b. Further, the first-side flexible portions 134a and the second-side flexible portions 134b are coupled with each other. These features can also contribute to stable extension and compression of the frame 130 and the bag main body 110.

Further, according to the dust bag 100, the first distal edge portion 136 of the first-side flexible portion 134a and the second distal edge portion 137 of the second-side flexible portion 134b are coupled with each other in the third direction D3, and this can minimize the portion where the first-side flexible portion 134a and the second-side flexible portion 134b are coupled. Therefore, the dust bag 100 allows the coupling portion to less impair the flexibility of the flexible portions 134 (the first-side flexible portions 134a and the second-side flexible portions 134b). Further, the dust bag 100 also allows the frame 130 to be manufactured using a smaller amount of material.

Having described the embodiments of the present disclosure, the above-described embodiments are intended to only facilitate the understanding of the present teachings, and are not intended to limit the present invention thereto. The present disclosure can be modified or improved without departing from the spirit thereof, and the present disclosure includes equivalents thereof. Further, each of the elements described in the claims and the specification can be combined in any manner or omitted in any manner within a range that allows it to remain capable of achieving at least a part of the above-described objects or bringing about at least a part of the above-described advantageous effects.

For example, the first portion 40 inclined at the first angle θ1 and the second portion 41 inclined at the second angle θ2 can be formed at any location on the outer periphery of the pad 31. Further, the respective numbers of first portions 40 and second portions 41 can be set in any manner. For example, the first portion 40 may be formed on the corner portion 35 and/or the corner portion 36 instead of or in addition to the corner portion 34. Alternatively, the first portion 40 may be formed on the side edge portion 37 and/or the side edge portion 38. Alternatively, the second portion 41 may be formed on at least one of the corner portions 34 to 36.

Further, the pad 31 is not limited to the generally triangular shape like the above-described iron, and can be changed to any shape. For example, the shape of the pad 31 may be generally equilateral triangular or may be rectangular as viewed vertically. Even in these cases, the first portion 40 and the second portion 41 can be formed at any locations.

Further, the shape of the above-described frame 130 is merely an example, and the numbers, the shapes, the layouts, and the like of the non-flexible portions 131 and the flexible portions 134 can be changed in any manner as long as the flexibility in the first direction D1 can be provided with the aid of at least one flexible portion 134 extending in a direction intersecting with the first direction D1 and the direction perpendicular to the first direction D1, and at least one non-flexible portion 131 and at least one flexible portion 134 can maintain the outer shape of the bag main body 110. Further, the outer shape of the bag main body 110 can be changed to any shape without being limited to the above-described generally cuboidal shape.

Further, the above-described embodiments can be applied to not only the orbital sander but also any power tool configured to allow the dust bag 100 to be detachably mounted thereon. Such a power tool may be, for example, another type of sander, a portable circular saw, a slide circular saw, a planar, or the like. Further, such a power tool may be an electric tool including an electric motor or may be a pneumatic tool including a pneumatic motor.

The corresponding relationship between each component in the above-described embodiments and each component of the claims will be described below. However, each component in the embodiments is merely one example and shall not limit each component of the claims. The sander 10 is one example of a "power tool." The bag main body 110 is one example of a "bag main body." The connector 120 is one example of a "connector." The frame 130 is one example of a "frame." The first direction D1 is one example of a "first direction." The second direction D2 is one example of a "second direction" or a "third direction." The third direction D3 is one example of the "second direction" or the "third direction." The non-flexible portions 131 are one example of "at least one non-flexible portion" and a "plurality of non-flexible portions." The non-flexible portions 133 are one example of "at least one non-flexible portion." The flexible portions 134 are one example of "at least one flexible portion" and a "plurality of flexible portions." The first-side non-flexible portions 131*a* are one example of a "first-side non-flexible portion." The second-side non-flexible portions 131*b* are one example of a "second-side non-flexible portion." The first-side flexible portions 134*a* are one example of a "first-side flexible portion." The second-side flexible portions 134*b* are one example of a "second-side flexible portion." The first distal edge portion 136 is one example of a "first distal edge portion." The second distal edge portion 137 is one example of a "second distal edge portion." The electric motor 60 is one example of an "electric motor." The dust collection nozzle 29 is one example of a "connector" of the power tool. The power source cord 26 is one example of a "cable or cord".

DESCRIPTION OF THE REFERENCE NUMERALS

- 10 sander
- 20 housing
- 21 front housing portion
- 22 grip portion
- 23 rear housing portion
- 24 connector
- 26 power source cord
- 27 switch button
- 28 dust collection passage
- 29 dust collection nozzle
- 30 tool accessory
- 31 pad
- 32 base
- 33 flat surface
- 34, 35, 36 corner portion
- 37, 38, 39 side edge portion
- 40 first portion
- 41 second portion
- 42 transition portion
- 43 through-hole
- 44 space
- 45 proximal edge
- 46 distal edge
- 47 side surface
- 48 switch unit
- 50 dust collection fan
- 51 face plate
- 52 shaft portion
- 53 blade
- 60 electric motor
- 61 motor shaft
- 62, 63, 64 bearing
- 65 controller
- 66 foot
- 100 dust bag
- 110 bag main body
- 111 band
- 120 connector
- 121 through-hole
- 130 frame
- 131 non-flexible portion
- 131*a* first-side non-flexible portion
- 131*b* second-side non-flexible portion
- 133 non-flexible portion
- 134 flexible portion
- 134*a* first-side flexible portion
- 134*b* second-side flexible portion
- 136 first distal edge portion
- 137 second distal edge portion
- 138 fitted portion
- D1 first direction D2 second direction
D3 third direction
θ1 first angle
θ2 second angle

What is claimed is:

1. A dust bag for a power tool, the dust bag comprising:
a bag main body made of cloth;
a connector for connecting to the power tool, the connector having a through-hole opened in a first direction and in communication with an inside of the bag main body; and
a frame disposed inside the bag main body so as to maintain an outer shape of the bag main body,
wherein the frame includes at least one non-flexible portion extending in the first direction and/or a second direction perpendicular to the first direction so as not to have flexibility in the first direction, and at least one flexible portion coupled with the at least one non-flexible portion and extending in an intersection direction intersecting with the first direction and the second direction so as to have flexibility in the first direction,
the frame is configured to be extensible and compressible in the first direction due to the at least one flexible portion deflected when an external force is applied in the first direction, and
a total width of the at least one flexible portion in the first direction is equal to or wider than a total width of the at least one non-flexible portion in the first direction.

2. The dust bag according to claim 1, wherein the frame is made from synthetic resin.

3. The dust bag according to claim 1, wherein the frame is an integrally formed member.

4. The dust bag according to claim 1, wherein the frame is shaped and sized so as to keep the outer shape of the bag main body to a generally cuboidal shape rectangular in cross-section perpendicular to the first direction.

5. A power tool comprising:
the dust bag according to claim 1;
an electric motor; and
a connector for connecting to the connector of the dust bag.

6. The dust bag according to claim 1, wherein the at least one flexible portion has a pulse shape extending from the at least one non-flexible portion in a direction away from the at least one non-flexible portion and bent back to extend to the at least one non-flexible portion.

7. The dust bag according to claim 6, wherein the at least one non-flexible portion includes a first-side non-flexible portion and a second-side non-flexible portion disposed so as to be spaced apart from each other in the second direction or a third direction perpendicular to the first direction and different from the second direction, and
the at least one flexible portion includes
a first-side flexible portion having a pulse shape extending from the first-side non-flexible portion toward the second-side non-flexible portion and bent back to extend to the first-side non-flexible portion, and
a second-side flexible portion having a pulse shape extending from the second-side non-flexible portion toward the first-side non-flexible portion and bent back to extend to the second-side non-flexible portion.

8. The dust bag according to claim 7, wherein the first-side flexible portion and the second-side flexible portion are coupled with each other.

9. The dust bag according to claim 8, wherein the first-side flexible portion includes a first distal edge portion having the pulse shape,
the second-side flexible portion includes a second distal edge portion having the pulse shape, and
the first distal edge portion and the second distal edge portion are coupled in a direction in which the first-side non-flexible portion and the second-side non-flexible portion are spaced apart from each other.

10. The dust bag according to claim 1, wherein the at least one non-flexible portion includes a plurality of non-flexible portions,
the at least one flexible portion includes a plurality of flexible portions, and
the non-flexible portions and the flexible portions are alternately coupled along the first direction.

11. The dust bag according to claim 10, wherein the at least one flexible portion has a pulse shape extending from the at least one non-flexible portion in a direction away from the at least one non-flexible portion and bent back to extend to the at least one non-flexible portion.

12. The dust bag according to claim 10, wherein the at least one flexible portion has a pulse shape extending from the at least one non-flexible portion in a direction away from the at least one non-flexible portion and bent back to extend to the at least one non-flexible portion,
the at least one non-flexible portion includes a first-side non-flexible portion and a second-side non-flexible portion disposed so as to be spaced apart from each other in the second direction or a third direction perpendicular to the first direction and different from the second direction, and
the at least one flexible portion includes
a first-side flexible portion having a pulse shape extending from the first-side non-flexible portion toward the second-side non-flexible portion and bent back to extend to the first-side non-flexible portion, and
a second-side flexible portion having a pulse shape extending from the second-side non-flexible portion toward the first-side non-flexible portion and bent back to extend to the second-side non-flexible portion.

13. The dust bag according to claim 10, wherein the at least one flexible portion has a pulse shape extending from the at least one non-flexible portion in a direction away from the at least one non-flexible portion and bent back to extend to the at least one non-flexible portion,
the at least one non-flexible portion includes a first-side non-flexible portion and a second-side non-flexible portion disposed so as to be spaced apart from each other in the second direction or a third direction perpendicular to the first direction and different from the second direction,
the at least one flexible portion includes
a first-side flexible portion having a pulse shape extending from the first-side non-flexible portion toward the second-side non-flexible portion and bent back to extend to the first-side non-flexible portion, and
a second-side flexible portion having a pulse shape extending from the second-side non-flexible portion toward the first-side non-flexible portion and bent back to extend to the second-side non-flexible portion, and
the first-side flexible portion and the second-side flexible portion are coupled with each other.

14. The dust bag according to claim 10, wherein the at least one flexible portion has a pulse shape extending from the at least one non-flexible portion in a direction away from the at least one non-flexible portion and bent back to extend to the at least one non-flexible portion, the at least one non-flexible portion includes a first-side non-flexible portion and a second-side non-flexible portion disposed so as to be spaced apart from each other in the second direction or a third direction perpendicular to the first direction and different from the second direction, the at least one flexible portion includes a first-side flexible portion having a pulse shape extending from the first-side non-flexible portion toward the second-side non-flexible portion and bent back to extend to the first-side non-flexible portion, and a second-side flexible portion having a pulse shape extending from the second-side non-flexible portion toward the first-side non-flexible portion and bent back to extend to the second-side non-flexible portion, the first-side flexible portion and the second-side flexible portion are coupled with each other, the first-side flexible portion includes a first distal edge portion having the pulse shape, the second-side flexible portion includes a second distal edge portion having the pulse shape, and the first distal edge portion and the second distal edge portion are coupled in a direction in which the first-side non-flexible portion and the second-side non-flexible portion are spaced apart from each other.

15. The dust bag according to claim 10, wherein the frame is shaped and sized so as to keep the outer shape of the bag main body to a generally cuboidal shape rectangular in cross-section perpendicular to the first direction.

16. The dust bag according to claim 10, wherein the at least one flexible portion has a pulse shape extending from the at least one non-flexible portion in a direction away from the at least one non-flexible portion and bent back to extend to the at least one non-flexible portion, and the frame is shaped and sized so as to keep the outer shape of the bag main body to a generally cuboidal shape rectangular in cross-section perpendicular to the first direction.

17. A dust bag for a power tool, the dust bag comprising:

a bag main body made of cloth;

a connector for connecting to the power tool, the connector having a through-hole opened in a first direction and in communication with an inside of the bag main body; and a frame disposed inside the bag main body so as to maintain an outer shape of the bag main body, wherein the frame includes at least one non-flexible portion extending in the first direction and/or a second direction perpendicular to the first direction so as not to have flexibility in the first direction, and at least one flexible portion coupled with the at least one non-flexible portion and extending in an intersection direction intersecting with the first direction and the second direction so as to have flexibility in the first direction, the frame is configured to be extensible and compressive in the first direction due to the at least one flexible portion deflected when an external force is applied in the first direction, and the frame is shaped and sized so as to keep the outer shape of the bag main body to a generally cuboidal shape rectangular in cross-section perpendicular to the first direction.

18. A power tool comprising:

the dust bag according to claim 17, an electric motor; and a connector for connecting to the connector of the dust bag, wherein the power tool is configured in such a manner that, when the dust bag is mounted on the power tool by connecting the connector of the dust bag to the connector of the power tool, a cable or a cord for supplying power to the electric motor, which is provided to the power tool or detachably connected to the power tool, and the dust bag are arranged in a shorter-side direction of the rectangle.

\* \* \* \* \*